US012704918B2

(12) United States Patent
Min et al.

(10) Patent No.: US 12,704,918 B2
(45) Date of Patent: Aug. 11, 2026

(54) DISPLAY DEVICE, TOUCH DISPLAY PANEL, AND TOUCH PANEL AND MANUFACTURING METHOD THEREFOR

(71) Applicants: Chengdu BOE Optoelectronics Technology Co., Ltd., Chengdu (CN); BOE Technology Group Co., Ltd., Beijing (CN)

(72) Inventors: Hang Min, Beijing (CN); Liqing Jiang, Beijing (CN); Guiyu Zhang, Beijing (CN); Hongqiang Luo, Beijing (CN); Qiang Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/928,238

(22) Filed: Oct. 28, 2024

(65) Prior Publication Data

US 2025/0053256 A1 Feb. 13, 2025

Related U.S. Application Data

(63) Continuation of application No. 18/283,224, filed as application No. PCT/CN2021/131566 on Nov. 18, 2021, now Pat. No. 12,373,051.

(30) Foreign Application Priority Data

Mar. 22, 2021 (CN) ......................... 202110302603.7

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 2203/04103* (2013.01)

(58) Field of Classification Search
CPC ................ G06F 3/0412; G06F 3/0446; G06F 2203/04103; G06F 3/041
See application file for complete search history.

(56) References Cited

U.S. PATENT DOCUMENTS 5,870,156 A * 2/1999 Heembrock ...... G02F 1/133553 349/110
7,298,076 B2 * 11/2007 Ozolins .............. G09F 15/0087 220/2.1 R (Continued)

FOREIGN PATENT DOCUMENTS

CN 102591503 A 7/2012
CN 207354368 U 5/2018

(Continued)

OTHER PUBLICATIONS

International Search Report and Written Opinion mailed on Feb. 17, 2022, in corresponding PCT/CN2021/131566, 6 pages.

(Continued)

*Primary Examiner* — Jeff Piziali
(74) *Attorney, Agent, or Firm* — XSENSUS LLP

(57) ABSTRACT

The present invention relates to the technical field of display, and relates to a display device, a touch display panel, and a touch panel and a manufacturing method therefor. The touch panel of the present invention may comprise a substrate, a touch layer, and a light shielding layer, the touch layer being provided on one side of the substrate. The light shielding layer and the touch layer are provided on the same side of the substrate; the light shielding layer is annular and surrounds the touch layer.

4 Claims, 6 Drawing Sheets

(56) References Cited

U.S. PATENT DOCUMENTS 9,726,808 B2 8/2017 Lin
10,473,981 B2* 11/2019 Kao .................... G02B 6/0056
2009/0308525 A1* 12/2009 Lin .................. B29D 11/00365 156/245
2011/0193780 A1* 8/2011 Schaaf .................. G06F 1/1647 345/163
2011/0241553 A1* 10/2011 Schindler ................ G09F 13/06 315/149
2012/0069276 A1* 3/2012 Ishikawa ............... G02F 1/1396 349/103
2013/0038545 A1* 2/2013 Hsu ......................... G06F 3/041 345/173
2013/0063050 A1* 3/2013 Morikawa .............. G09G 3/001 315/316
2013/0070188 A1* 3/2013 Ishikawa ................ H04N 13/31 349/110
2014/0218412 A1* 8/2014 Hwangbo ............ G09G 3/3208 345/82
2014/0218670 A1* 8/2014 Nagano ............. G02F 1/133512 349/110
2014/0226113 A1* 8/2014 Ishikawa ........... G02F 1/134309 349/110
2016/0041329 A1 2/2016 Lin
2022/0230585 A1* 7/2022 Komazawa ............ H04N 23/63

FOREIGN PATENT DOCUMENTS

CN 110231891 A 9/2019
CN 209895322 U 1/2020
CN 112860126 A 5/2021
TW 201308147 A 2/2013
TW 1471773 B 2/2015
WO 2020087820 A1 5/2020

OTHER PUBLICATIONS

Office Action issued on Jun. 30, 2023, in corresponding Chinese patent Application No. 202110302603. 7, 9 pages.

Dictionary.com, “adjacent,” in Dictionary.com Unabridged. Source location: Random House, Inc. http://dictionary.reference.com/browse/adjacent, Nov. 18, 2011, p. 1.

* cited by examiner

DISPLAY DEVICE, TOUCH DISPLAY PANEL, AND TOUCH PANEL AND MANUFACTURING METHOD THEREFOR

CROSS-REFERENCE TO RELATED APPLICATIONS

This disclosure is a continuation of U.S. application Ser. No. 18/283,224, filed on Sep. 21, 2023, which is a U.S. National Stage of International Application No. PCT/CN2021/131566, filed on Nov. 18, 2021, which claims priority to the Chinese Patent Application No. 202110302603.7, filed on Mar. 22, 2021, and entitled "DISPLAY DEVICE, TOUCH DISPLAY PANEL, AND TOUCH PANEL AND MANUFACTURING METHOD THEREFOR", the entire contents of each are incorporated herein by reference in its entirety.

TECHNICAL FIELD

The present disclosure relates to the field of display technology, in particular, to a display device, a touch display panel, a touch panel and a manufacturing method therefor.

BACKGROUND

At present, electronic devices such as mobile phones, laptops, and tablets have become necessities in people's lives. In these electronic devices, logo graphics, i.e., LOGO, such as trademarks, are usually set at specific positions. General logo graphics are usually patterns displayed with a fixed structure and a specific color, which is likely to wear off after long-term use.

It should be noted that the information disclosed in the above background section is only used to enhance understanding of the background of the present disclosure, and therefore may include information that does not constitute prior art known to those of ordinary skill in the art.

SUMMARY

The purpose of the disclosure is to provide a display device, a touch display panel, a touch panel and a manufacturing method therefor.

According to one aspect of the present disclosure, a touch panel is provided, including:

a substrate;

a touch layer, provided on a side of the substrate; and a light shielding layer, provided on an identical side of the substrate with the touch layer, wherein the light shielding layer is annular and surrounds outside the touch layer, the light shielding layer includes a light transmitting portion in a logo graphic, the light transmitting portion includes light transmitting holes distributed in an array, and an aperture ratio of the light transmitting portion satisfies the following formula:

$$T = N \times \pi \times (D/2)^2 / A;$$

where T is the aperture ratio, N is the number of light transmitting holes in the light transmitting portion, D is a diameter of the light transmitting hole, and A is an area of an orthogonal projection of the light transmitting portion on the substrate.

In an example embodiment of the present disclosure, the aperture ratio is not larger than 0.8.

In an example embodiment of the present disclosure, a distance between adjacent light transmitting holes is smaller than an aperture of any of the light transmitting holes.

In an example embodiment of the present disclosure, an aperture of the light transmitting hole is 5 μm-10 μm, and a distance between two adjacent light transmitting holes is 3 μm-8 μm.

In an example embodiment of the present disclosure, a material of the light shielding layer includes photoresist.

In an example embodiment of the present disclosure, the touch layer includes:

a plurality of first touch electrodes, extending along a row direction and distributed along a column direction;

a plurality of second touch electrodes, extending along the column direction and distributed along the row direction, wherein any of the second touch electrodes intersects with any of the first touch electrodes, and they are insulated at the intersection.

According to one aspect of the present disclosure, a method of manufacturing a touch panel is provided, including:

forming an annular light shielding layer on a side of the substrate, wherein the light shielding layer includes a light transmitting portion in a logo graphic, the light transmitting portion includes light transmitting holes distributed in an array, and an aperture ratio of the light transmitting portion satisfies the following formula:

$$T = N \times \pi \times (D/2)^2 / A;$$

where T is the aperture ratio, N is the number of light transmitting holes in the light transmitting portion, D is a diameter of the light transmitting hole, and A is an area of an orthogonal projection of the light transmitting portion on the substrate;

forming a touch layer on the side of the substrate provided with the light shielding layer, wherein the touch layer is located within a range surrounded by the light shielding layer.

According to one aspect of the present disclosure, a touch display panel is provided, including:

any of the above touch panels; and a display substrate, provided on a side of the light shielding layer away from the substrate, wherein the display substrate has a first display region and a second display region located outside the first display region, an orthographic projection of the first display region on the substrate is located within a range surrounded by the light shielding layer, and an orthographic projection of the second display region on the substrate at least partially coincides with the orthographic projection of the light transmitting portion on the substrate.

In an example embodiment of the present disclosure, the display substrate includes:

a driving backplane;

a light-emitting device layer, provided on a side of the driving backplane close to the touch panel and including a plurality of light-emitting devices, wherein the plurality of light-emitting devices are provided in both the first display region and the second display region.

In an example embodiment of the present disclosure, the display substrate includes:

an array substrate;

a liquid crystal layer, provided on a side of the array substrate close to the touch panel;

a color film substrate, provided on a side of the liquid crystal layer close to the touch panel, wherein the color film substrate includes a plurality of filter parts, and the plurality of filter parts are provided in both the first display region and the second display region.

According to one aspect of the present disclosure, a touch display panel is provided, including:

any of the above touch panels;

a display substrate, provided on a side of the light shielding layer away from the substrate; and a light-emitting element, provided between the light shielding layer and the display substrate, and configured to emit light to the light transmitting portion.

According to one aspect of the present disclosure, a display device is provided, including:

any of the above touch display panels; and a housing, provided outside the touch display panel, wherein the light shielding layer is located in the housing, the housing has a light transmitting region, and orthographic projections of the light transmitting region and the light transmitting portion on the substrate at least partially coincide.

It should be understood that the above general description and the following detailed description are only exemplary and explanatory and do not limit the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. The drawings in the following description are only some embodiments of the present disclosure, and those skilled in the art can obtain other drawings according to these drawings without creative efforts.

EXPLANATION OF REFERENCE NUMERALS

In FIG. 1-FIG. 6, FIG. 8 and FIG. 9: 1, touch panel; 11, substrate; 110, touch region; 111, edge region; 12, touch layer; 121, first touch electrode; 122, second touch electrode; 1221, connection unit; 1222, electrode unit; 13, light shielding layer; 131, light transmitting portion; 1310, light transmitting hole; 2, display substrate; 21, first display region; 22, second display region; 23. peripheral region; 3. light-emitting element; 4. housing; 41. light transmitting region.

Figures 7, 8:
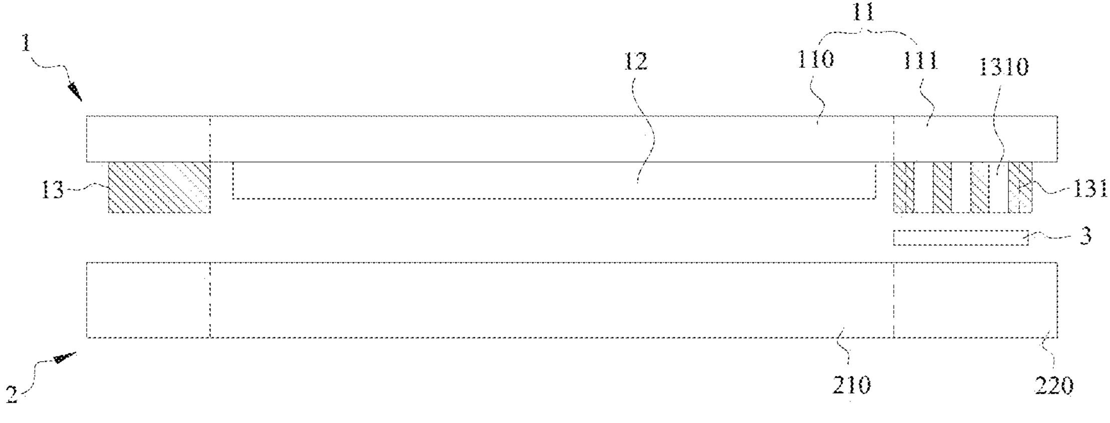
FIG. 7 is a cross-sectional view of the touch display panel according to another embodiment of the present disclosure.
FIG. 8 is a cross-sectional view of a display device according to an embodiment of the present disclosure.

In FIG. 7: 210, display region; 220, peripheral region.

DETAILED DESCRIPTION

Example embodiments will now be described more fully with reference to the accompanying drawings. Example embodiments may, however, be embodied in various forms and should not be construed as limited to the embodiments set forth herein; rather, these embodiments are provided so that this disclosure will be thorough and complete and will fully convey the concepts of the example embodiments to those skilled in the art. The same reference numerals in the drawings indicate the same or similar structures, and thus their detailed descriptions will be omitted. Further, the drawings are merely schematic illustrations of the present disclosure and are not necessarily drawn to scale.

The terms "a", "an", "the", "said" and "at least one" are used to indicate the presence of one or more elements/components/etc.; the terms "include" and "have" are used to indicate an open-ended inclusive meaning and means that in addition to the listed elements/components/etc., there may be additional elements/components/etc.; the terms "first", "second", etc. are used only as markers, no limitation on the number of its objects.

The embodiment of the present disclosure provides a touch panel, which can be used for a touch display panel. The touch display panel can include a display substrate and the touch panel of the present disclosure. The touch panel can be used to sense the user's touch operation, determine the touch position. The display substrate may be an OLED (organic electroluminescence) display substrate or a liquid crystal display substrate, which is not particularly limited here.

Figure 1:
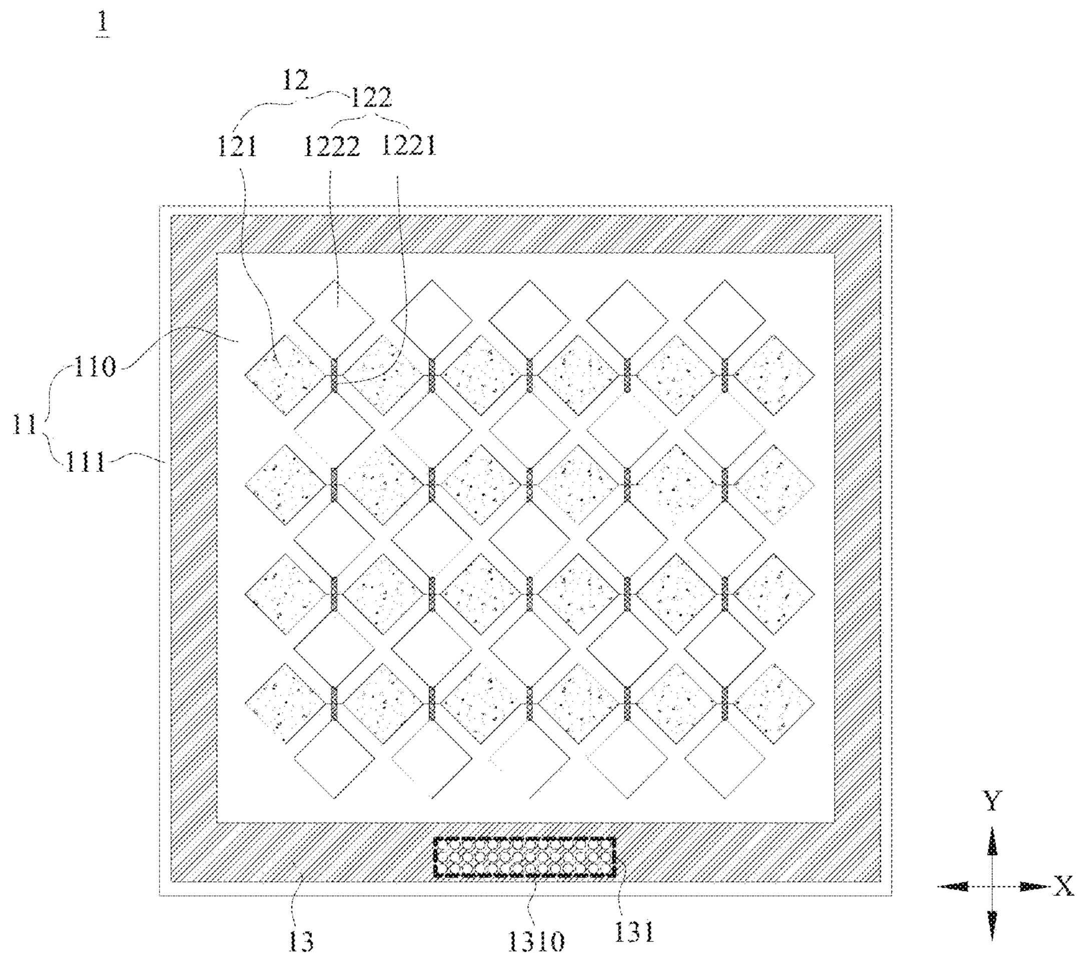
FIG. 1 is a top view of a touch panel according to an embodiment of the present disclosure.
Figure 2:
FIG. 2 is a cross-sectional view of a touch panel according to an embodiment of the present disclosure.
Figure 2:
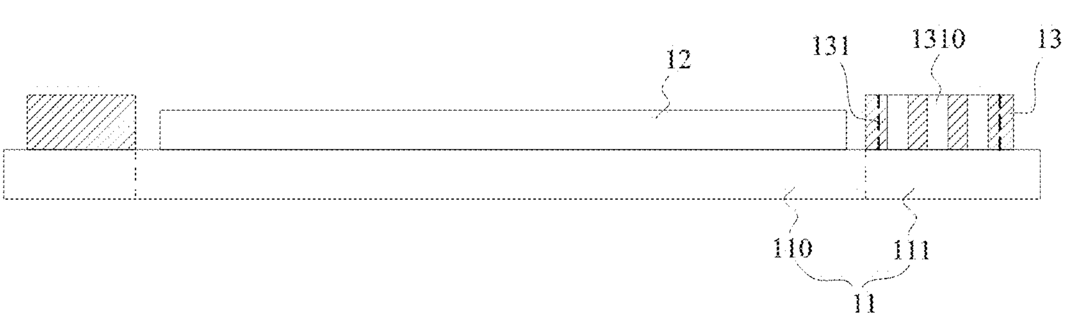
Figure 3:
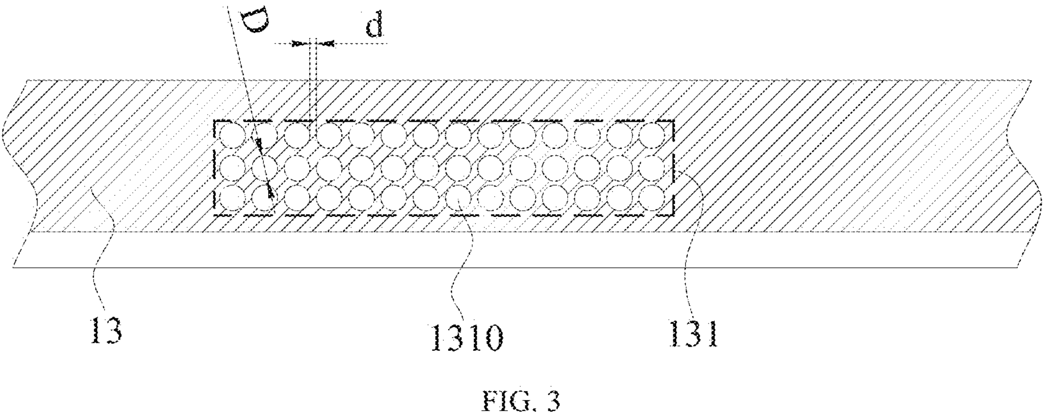
FIG. 3 is a partial schematic diagram of the touch panel according to an embodiment of the present disclosure.

As shown in FIGS. 1-3, the touch panel 1 of the present disclosure may include a substrate 11, a touch layer 12 and a light shielding layer 13.

The touch layer 12 is disposed on one side of the substrate 11. The light shielding layer 13 and the touch layer 12 are disposed on the same side of the substrate 11. The light shielding layer 13 is annular and surrounds outside the touch layer 12. The light shielding layer 13 includes a light transmitting portion 131 in the form of a logo graphic.

In combination with FIG. 8, the touch panel of the present disclosure can use the second display region 22 of the display substrate 2 or a special light source to emit light to the light transmitting portion 131. After the light emitted by the light transmitting portion 131 passes through the light transmitting region 41 of the housing, a logo graphic can be displayed in the housing 4, instead of displaying the logo graphic by using a fixed structure and a fixed painting color, which can avoid wear of the logo graphic. In addition, the color of the logo graphic can be adjusted in real time by controlling the luminous color. At the same time, in the shutdown state, the logo graphic may not be displayed, to reduce energy consumption.

Each part of the touch panel 1 of the present disclosure is described in detail below.

As shown in FIGS. 1 and 2, the substrate 11 can be a flat plate structure, which can adopt a single-layer or multi-layer structure. The material of the substrate 11 can include hard materials such as glass, or can also include flexible materials such as polyimide, which is not particularly limited here. At the same time, the substrate 11 may include a touch region 110 and an edge region 111 surrounding outside the touch region 110. The touch region 110 and the edge region 111 are divided only according to the functions of the carried film layers, and there may be no boundaries that may be actually observed.

As shown in FIGS. 1 and 2, the touch layer 12 is provided on a side of the substrate 11, and located in the touch region 110, for sensing the touch operation of the user, and determining the touch region 110 according to the touch operation, so as to control the picture displayed by the display substrate, to realize human-computer interaction. The touch layer 12 can adopt a self-capacitive structure or a mutual-capacitive structure. It can also be adopt a resistive structure. There is no special limitation here, as long as the touch function can be realized.

In some embodiments of the present disclosure, the touch layer 12 has a mutual-capacitive structure. Specifically, as shown in FIG. 1, the touch layer 12 may include a plurality of first touch electrodes 121 and a plurality of second touch electrodes 121.

Each first touch electrode 121 may extend along the row direction and be spaced apart along the column direction. The plurality of second touch electrodes 122 may extend along the column direction and be spaced apart along the row direction. Any second touch electrode 122 intersects with each first touch electrode 121 and they are insulated at the intersection.

In order to prevent the first touch electrode 121 and the second touch electrode 122 from being short-circuited, the touch layer 12 may include a conductive layer, an insulating layer and a connection layer.

The conductive layer is disposed in the touch region 110 of the substrate 11 and includes a plurality of first touch electrodes 121. The first touch electrodes 121 can extend along the row direction and are spaced apart along the column direction. At the same time, the conductive layer may also include a plurality of electrode unit groups. Each electrode unit group extends along the column direction and is distributed along the row direction. Each electrode unit group includes a plurality of electrode units 1222 distributed along the column direction, and a row of electrode units 1222 distributed along the row direction is disposed between two adjacent first touch electrodes 121. The row direction is shown as the X direction in FIG. 1, and the column direction is shown as the Y direction in FIG. 1.

The insulating layer covers the conductive layer, which is made of transparent insulating material, and the surface of the insulating layer away from the substrate 11 can be flat.

The connection layer is provided on the surface of the insulating layer away from the substrate 11. The connection layer may include a plurality of connection units 1221. In the column direction, two adjacent electrode units 1222 are connected through one connection unit 1221. Any second touch electrode 122 includes a column of connection units 1221 and the electrode units 1222 connected thereto. The material of the connection layer can be a transparent conductive material, such as ITO (indium tin oxide).

It should be noted that, the first touch electrode 121 and the second touch electrode 122 are interchangeable. That is, the first touch electrode 121 can extend along the column direction and be distributed along the row direction. The second touch electrode 122 can extend along the row direction and be distributed along the column direction. FIG. 1 is only an example illustration and does not constitute a specific limitation on the directions and patterns of the first touch electrode 121 and the second touch electrode 122.

As shown in FIGS. 1 to 3, the light shielding layer 13 and the touch layer 12 are disposed on the same side of the substrate 11. For example, the light shielding layer 13 and the touch layer 12 can be disposed on the same surface of the substrate 11. The light shielding layer 13 can be located in the edge region 111 of the substrate 11 and provided around the touch layer 12. That is, the touch layer 12 is located within the range surrounded by the light shielding layer 13. The light shielding layer 13 can be made of resin materials such as photoresist, and is opaque. The light shielding layer 13 can also be made of other materials as long as it blocks light. The thickness of the light shielding layer 13 is not less than that of the touch layer 12. When the touch panel 1 and the display substrate 2 are placed opposite to each other, the light shielding layer 13 can be attached to the display substrate 2, to play the role of support and adhesion.

The shape of the orthographic projection of the light shielding layer 13 on the substrate 11 may depend on the shape of the substrate 11. If the substrate 11 is rectangular, the shape of the orthographic projection of the light shielding layer 13 on the substrate 11 may be rectangular. If the substrate 11 is circular, the shape of the orthographic projection of the light shielding layer 13 on the substrate 11 may be circular.

As shown in FIGS. 1-3, the light shielding layer 13 may include a light transmitting portion 131. The light transmitting portion 131 is located in a local region of the light shielding layer 13, and has a preset logo graphic. The specific shape of the logo graphic is not specially limited here, which can be geometric graphics or texts, used to display product trademarks or other identification patterns. When light passes through the light transmitting portion 131, the pattern displayed by the logo graphic can be displayed. If no light passes through the light transmitting portion 131, the logo graphic is not displayed.

In some embodiments of the present disclosure, as shown in FIGS. 1-3, the light transmitting portion 131 may include a plurality of light transmitting holes 1310 distributed in an array. The light transmitting holes 1310 penetrate through the light shielding layer 13 in a direction perpendicular to the substrate 11, which allows the light to pass through. A specific pattern, i.e., a logo graphic, can be formed through the distribution of the light transmitting holes 1310. Each light transmitting hole 1310 is a basic element constituting the logo graphic. The light transmitting portion 131 may also be a continuous, completely light transmitting region.

The aperture ratio of the light transmitting portion 131 satisfies the following formula:

$$T = N \times \pi \times (D/2)^2 / A;$$

where T is the aperture ratio, N is the number of light transmitting holes 1310 in the light transmitting portion 131, D is a diameter of the light transmitting hole 1310, and A is an area of an orthogonal projection of the light transmitting portion 131 on the substrate 1.

If the aperture ratio is too large, it will be difficult for the light shielding layer 13 to play the role of shielding. Therefore, the aperture ratio can be made not greater than 0.8. That is, the area of the light transmitting region in the light transmitting portion 131 is not greater than 80% of the total area.

Further, in order to be able to see the logo graphic when there is light, and to have a certain blocking effect on the region of the display substrate 2 corresponding to the light transmitting portion 131 when there is no light, it is necessary to limit the size and density of the light transmitting holes 1310 in the light transmitting portion 131 to a certain extent.

Through a large number of tests and analysis, as shown in FIG. 3, the applicant concluded that the aperture D of the light transmitting hole 1310 can be 5 μm-10 μm, for example, 5 μm, 7 μm, 8 μm, and 10 μm, etc. The distance d between two adjacent light transmitting holes 1310 is 3 μm-8 μm, such as 3 μm, 5 μm, 6 μm and 8 μm, etc. Further, the aperture D of the light transmitting hole 1310 may be 5 μm-10 μm, and the distance d between two adjacent light transmitting holes 1310 may be 5 μm-6 μm.

It should be noted that, in the embodiment of the present disclosure, if the light transmitting hole 1310 is a circular hole, its aperture is the diameter of the light transmitting hole 1310. If the light transmitting hole 1310 is a regular polygonal hole, the aperture is the diameter of its circumscribed circle. If the light transmitting hole 1310 has other shapes, the aperture is the distance between two farthest points on the edge of the light transmitting hole 1310. That is to say, regardless of the shape of the light transmitting hole 1310, its aperture is not larger than the distance between the two furthest points on its edge. At the same time, the distance between two adjacent light transmitting holes 1310 is the distance between the closest points of the two light transmitting holes 1310.

Further, as shown in FIG. 3, the distance d between adjacent light transmitting holes 1310 can be smaller than the aperture D of any one of the light transmitting holes 1310, that is, $d<D$, to avoid being unable to display clear and variable logo graphics due to the light transmitting holes 1310 being too sparse. For example, the distance between two adjacent light transmitting holes 1310 is 5 μm, and the aperture of the light transmitting hole 1310 is 7 μm.

Figures 4, 5:
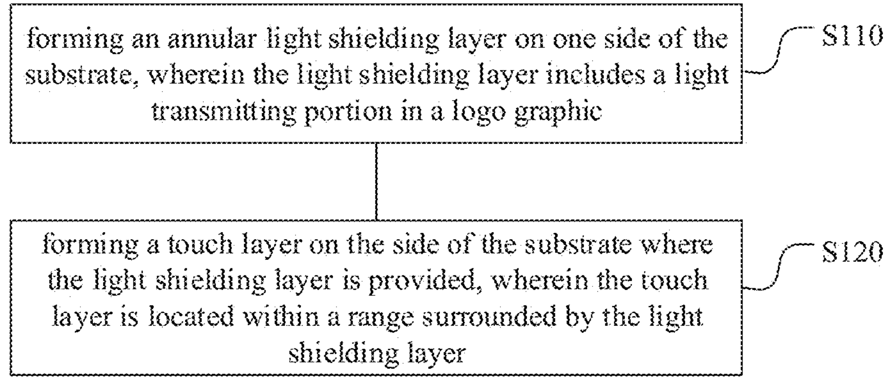
FIG. 4 is a flow chart of the manufacturing method according to an embodiment of the present disclosure.
FIG. 5 is a cross-sectional view of a touch display panel according to an embodiment of the present disclosure.

The present disclosure provides a method for manufacturing a touch panel. The touch panel can be the touch panel of any of the above embodiments. As shown in FIG. 4, the manufacturing method can include step S110 and step S120.

Step S110, an annular light shielding layer is formed on one side of the substrate, wherein the light shielding layer includes a light transmitting portion in a logo graphic.

Step S120, a touch layer is formed on the side of the substrate where the light shielding layer is provided, wherein the touch layer is located within a range surrounded by the light shielding layer.

In some embodiments of the present disclosure, the substrate can be made of glass, for example, it can be tempered white glass, and the light shielding layer can adopt the black photoresist. In step S110, the substrate may be cleaned first, and then a layer of black photoresist may be applied on the substrate. Then, the substrate and the black photoresist thereon are put into the exposure machine, a mask is used for exposure, and the pattern on the mask is transferred to the black photoresist. Then, it is developed in a developer to retain the pattern of the logo graphic of the light shielding layer and its light transmitting portion, thereby obtaining a light shielding layer with a light transmitting portion.

The details of the touch panel manufactured by the manufacturing method of the present disclosure have been described in detail in the above embodiments of the touch panel, and will not be described again here.

It should be noted that although various steps of the manufacturing method in the present disclosure are described in a specific order in the drawings, this does not require or imply that these steps must be performed in this specific order, or that all of the steps shown must be performed to achieve the desired result. Additionally or alternatively, certain steps may be omitted, multiple steps may be combined into one step for execution, and/or one step may be decomposed into multiple steps for execution, etc.

In the touch display panel using the above-mentioned touch panel, the light transmitting portion 131 needs to cooperate with the light to display the logo graphic. Therefore, the touch display panel needs to be provided with a light source for emitting light to the light transmitting portion 131. For example, the light-emitting device of the touch display panel itself can be used as a light source, to emit light to the light transmitting portion 131. An independent light source may also be used to emit light to the light transmitting portion 131, which will be described in detail as follows.

Figure 6:
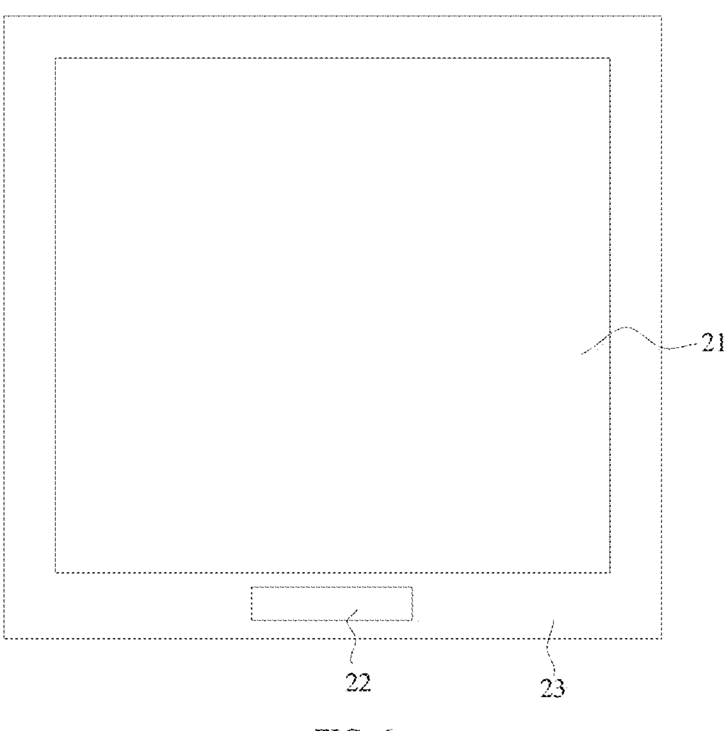
FIG. 6 is a top view of a display substrate in the touch display panel according to an embodiment of the present disclosure.

The present disclosure also provides a touch display panel, as shown in FIG. 5 and FIG. 6, which may include a touch panel 1 and a display substrate 2.

The touch panel 1 can be the touch panel 1 of any of the above-mentioned implementations, and its structure can refer to the above-mentioned implementation of the touch panel 1, which will not be repeated here.

The display substrate 2 is provided on the side of the light shielding layer 13 away from the substrate 11. The display substrate 2 has a first display region 21 and a second display region 22 located outside the first display region 21. Both the first display region 21 and the second display region 22 can emit light toward the touch panel 1.

Further, the display substrate 2 has a peripheral region 23 surrounding outside the first display region 21. The second display region 22 is located within the range of the peripheral region 23. That is to say, a local region of the peripheral region 23 can emit light, and this local region is the second display region 22. The second display region 22 and the first display region 21 may be two separated regions that can emit light. Alternatively, the second display region 22 and the first display region 21 may be continuous regions. That is, the second display region 22 may be a part of the first display region 21 extending into the peripheral region 23.

The orthographic projection of the first display region 21 on the substrate 11 is located within the range surrounded by the light shielding layer 13, and is used to display images for users to watch. The orthographic projection of the second display region 22 on the substrate 11 at least partially coincides with the orthographic projection of the light transmitting portion 131 on the substrate 11. At least part of the light emitted by the second display region 22 can pass through the light transmitting portion 131, such that the light transmitting portion 131 displays the logo graphic. Therefore, the display region of the display substrate 2 itself can be used to display images, while the second display region 22 serves as a light source to cause the light transmitting portion 131 to display the logo graphic.

In some embodiments of the present disclosure, as shown in FIGS. 5 and 6, the display substrate 2 may be an organic electroluminescent display panel. Specifically, the display substrate 2 may include a driving backplane and a light-emitting device layer.

The driving backplane includes a driving circuit, for driving the light-emitting device to emit light. For example, the driving backplane includes a pixel region and a peripheral circuit region located outside the pixel region. The pixel region is the region of the driving backplane corresponding to the first display region 21 and the second display region 22. The peripheral circuit region is the region of the driving backplane corresponding to the peripheral region 23.

The driving circuit may include a pixel circuit and a peripheral circuit. There are a plurality of pixel circuits located in the pixel region. The pixel circuit may be a 7T1C, 7T2C, 6T1C or 6T2C pixel circuit, as long as it can drive the light-emitting device to emit light. Its structure is not particularly limited herein. The number of pixel circuits is the same as the number of light-emitting devices, and they are connected to each light-emitting device in one-to-one correspondence, so as to respectively control each light-emitting device to emit light. In the embodiment, nTmC indicates that one pixel circuit includes n transistors (indicated by the letter "T") and m capacitors (indicated by the letter "C").

The peripheral circuit is located in the peripheral circuit region and is connected with the pixel circuit, for inputting a driving signal to the pixel circuit, so as to control the light-emitting device to emit light. The peripheral circuit may include a gate driving circuit and a light emission control circuit. The peripheral circuit may also include other circuits, and the specific structure of the peripheral circuit is not specifically limited here.

It should be noted that the pixel circuit for driving the second display region 22 may be located in the region of the second display region 22, that is, located in the peripheral region 23. Alternatively, it is also possible to form a space for accommodating the pixel circuits for driving the second display region 22 by compressing part of the pixel circuits corresponding to the first display region 21, and arrange the pixel circuits for driving the second display region 22 in the first display region 21.

The driving backplane can be formed by a plurality of film layers. For example, the driving backplane can include a substrate and a driving layer disposed on one side of the substrate. The substrate can be a single-layer or multi-layer structure, and it can be a rigid or flexible structure, which is not specifically limited here. The above driving circuit can be located in the driving layer. Taking the transistor in the driving circuit being a top-gate thin film transistor as an example, the driving layer can include an active layer, a first gate insulating layer, a gate, a second gate insulating layer, an interlayer dielectric layer, a first source-drain layer, a passivation layer, a first planarization layer, a second source-drain layer, and a second planarization layer.

The active layer is arranged on the substrate. The first gate insulating layer covers the active layer. The gate is arranged on the surface of the first gate insulating layer away from the substrate, and is directly opposite to the active layer. The second gate insulating layer covers the gate and the first gate insulating layer. The interlayer dielectric layer covers the second gate insulating layer. The first source-drain layer is arranged on the surface of the interlayer dielectric layer away from the substrate, and includes a source and a drain, and the source and the drain are connected to the active layer. The passivation layer covers the first source-drain layer. The first planarization layer covers the passivation layer. The second source-drain layer is arranged on the surface of the first planarization layer away from the substrate, and is connected with the first source-drain layer. The second planarization layer covers the second source-drain layer and the first planarization layer.

The light-emitting device layer is arranged on the side of the driving backplane close to the touch panel 1, and includes a plurality of light-emitting devices. The light-emitting devices can be connected to each pixel circuit in one-to-one correspondence, so as to emit light under the driving of the driving circuit. For example, the light-emitting device can be connected to the second source-drain layer, and can emit light under the driving of the driving circuit. Taking the light-emitting device being an organic electroluminescent device as an example, the light-emitting device may include a first electrode, a light-emitting functional layer and a second electrode stacked in sequence along a direction away from the driving backplane. The light-emitting functional layer may include a hole injection layer, a hole transport layer, a light-emitting material layer, an electron transport layer, and an electron injection layer stacked in sequence along the direction away from the driving backplane. The driving signal may be applied to the first electrode and the second electrode, holes and electrons are generated, and the holes and electrons are recombined into excitons in the light-emitting material layer, and the excitons radiate photons to generate visible light. The specific luminescence principle will not be described in detail here.

The display substrate 2 may include a first display region 21 and a second display region 22. The orthographic projection of the first display region 21 on the substrate 11 is located within the range surrounded by the light shielding layer 13, and the second display region 22 is located outside the first display region 21, and the range of the second display region 22 is smaller than the range of the first display region 21. The orthographic projection of the second display region 22 on the substrate 11 at least partially coincides with the orthographic projection of the light transmitting portion 131 on the substrate 11.

A plurality of light-emitting devices are provided in the first display region 21 and the second display region 22. The light-emitting devices in the first display region 21 can be used to display images, and the light-emitting devices in the second display region 22 can be used as light sources to emit light to the light transmitting portion 131, to display the logo graphic.

In addition, the touch display panel may further include an encapsulation layer, which may cover the surface of the display substrate 2 close to the touch panel 1. The touch panel 1 is disposed on a side of the encapsulation layer away from the display substrate 2.

In other embodiments of the present disclosure, as shown in FIG. 5 and FIG. 6, the display substrate 2 may be a liquid crystal display substrate 2. The display substrate 2 includes an array substrate, a liquid crystal layer, and a color film substrate.

The array substrate and the color film substrate are arranged opposite to each other, and the liquid crystal layer is arranged between the array substrate and the color film substrate. The display substrate 2 may further include a pixel electrode and a common electrode. Both the pixel electrode and the common electrode may be arranged between the array substrate and the color film substrate, to apply an electric field to the liquid crystal layer, to adjust the deflection direction of the liquid crystals in the liquid crystal layer, so as to achieve the purpose of adjusting the light transmission degree of the liquid crystal layer. The color film substrate includes a plurality of filter parts, and each filter part can transmit light of one color. According to the color of the filter parts, the filter parts can be divided into at least three types, and the filter parts of the same type have the same color, and the filter parts of different types have different colors.

The display substrate 2 may include a first display region 21 and a second display region 22. The orthographic projection of the first display region 21 on the substrate 11 is located within the range surrounded by the light shielding layer 13. The second display region 22 is located outside the first display region 21, and the range of the second display region 22 is smaller than the range of the first display region 21. The orthographic projection of the second display region 22 on the substrate 11 at least partially coincides with the orthographic projection of the transparent portion 131 on the substrate 11.

Both the first display region 21 and the second display region 22 are provided with a plurality of filter parts, so that both the first display region 21 and the second display region 22 can emit light, so that the first display region 21 can be used to display a picture, and the second display region 22 can be used to emit light to the light transmitting portion 131, to display the logo graphic.

The present disclosure also provides a touch display panel, as shown in FIG. 7, which may include a touch panel 1, a display substrate 2 and a light-emitting element 3.

The touch panel 1 can be the touch panel 1 of any of the above-mentioned implementations, and its structure can refer to the above-mentioned implementation of the touch panel 1, which will not be repeated here.

The display substrate 2 is arranged on the side of the light shielding layer 13 away from the substrate 11. The display substrate 2 has a display region 210 and a peripheral region 220 surrounding the display region 210, and the orthographic projection of the display region 210 on the substrate 11 is located within the range of the light shielding layer 13, for displaying images. The orthographic projection of the peripheral region 220 on the substrate 1 at least partially locates in the light shielding layer 13.

The light-emitting element 3 can be arranged between the light shielding layer 13 and the display substrate 2, and corresponds to the light transmitting portion 131. That is, the orthographic projection of the light-emitting element 3 on the substrate 11 at least partially coincides with the light transmitting portion 131, and the light-emitting element 3 is used for emitting light to the light transmitting portion 131, to display the logo graphic. The structure of the light-emitting element 3 is not particularly limited here, as long as it can emit light. For example, the light-emitting element 3 can be a light emitting diode. At the same time, the color and quantity of light emitted by the light-emitting element 3 are not particularly limited.

The present disclosure also provides a display device, as shown in FIG. 8, which may include a touch display panel and a housing 4.

The touch display panel can be the touch display panel in any of the above-mentioned implementations, and its structure and working principle can refer to the implementations of the touch panel 1 and the touch display panel above, and will not be repeated here.

Figure 9:
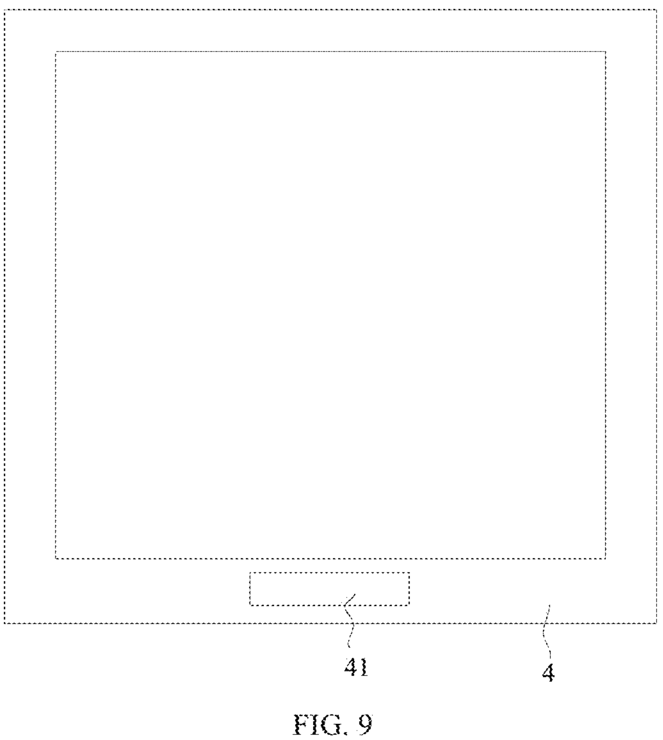
FIG. 9 is a cross-sectional view of a housing in a display device according to an embodiment of the present disclosure.

As shown in FIG. 9, the housing 4 is provided outside the touch display panel, and the light shielding layer 13 is located inside the housing 4. The housing 4 can be made of a light-shielding material. However, in order to prevent the housing 4 from blocking the light transmitting portion 131, the housing 4 can have a light transmitting region 41. The orthographic projections of the light transmitting region 41 and the light transmitting portion 131 on the substrate 11 at least partially coincide, such that the light transmitted by the light transmitting portion 131 can be transmitted to the outside of the housing 4 through the light transmitting region 41, ensuring that the user can see the logo graphic.

For example, as shown in FIG. 8 and FIG. 9, the housing 4 may include a frame. The frame is covered outside the edge of the touch display panel, and the light shielding layer 13 is located within the range of the frame, the light transmitting region 41 may be provided on a surface of the frame away from the display substrate 2.

There are many ways to realize the light transmitting region 41. For example, in some embodiments of the present disclosure, the light transmitting region 41 can have openings in one-to-one correspondence with each light transmitting hole 1310 of the light transmitting portion 131, so that a logo graphic is formed in the light transmitting region 41. Further, in order to prevent external dust, water droplets, etc. from entering the housing 4 through the opening, the opening can be filled with a transparent material, or the light transmitting region 41 can be covered with a transparent protective layer.

In some other embodiments of the present disclosure, the light transmitting region 41 may also adopt a transparent material consistent with the shape and size of the logo graphic, as long as the logo graphic can be seen.

The display device of the present disclosure may be an electronic device with an image display function, such as a television, a notebook computer, a tablet computer, and a mobile phone, and will not be listed here.

Other embodiments of the present disclosure will be readily apparent to those skilled in the art from consideration of the specification and practice of the disclosure disclosed herein. This application is intended to cover any modification, use or adaptation of the present disclosure, and these modifications, uses or adaptations follow the general principles of the present disclosure and include common knowledge or conventional technical means in the technical field not disclosed in the present disclosure. The specification and embodiments are to be considered exemplary only, with the true scope and spirit of the disclosure indicated by the appended claims.

The invention claimed is:

1. A touch display panel, comprising:

a touch panel, wherein the touch panel comprises: a base substrate; a touch layer, provided on a side of the base substrate; and a light shielding layer, provided on an identical side of the base substrate with the touch layer, wherein the light shielding layer is annular and surrounds outside the touch layer, the light shielding layer comprises a light transmitting portion in a logo graphic, the light transmitting portion comprises light transmitting holes distributed in an array, and an aperture ratio of the light transmitting portion satisfies the following formula:

$$T = N \times \pi \times (D/2)^2 \big/ A;$$

where T is the aperture ratio, N is the number of light transmitting holes in the light transmitting portion, D is a diameter of any of the light transmitting holes, and A is an area of an orthogonal projection of the light transmitting portion on the base substrate; and a display substrate, provided on a side of the light shielding layer away from the base substrate, wherein the display substrate has a first display region and a second display region located outside the first display region, an orthographic projection of the first display region on the base substrate is located within a range surrounded by the light shielding layer, and an orthographic projection of the second display region on the base substrate at least partially coincides with the orthographic projection of the light transmitting portion on the base substrate, wherein the light transmitting holes penetrate through the light shielding layer in a direction perpendicular to the base substrate to allow light to pass through, wherein a distance between two adjacent light transmitting holes having no light transmitting hole disposed therebetween is smaller than an aperture of any of the light transmitting holes, to avoid failure to display clear and variable logo graphics due to the light transmitting holes being too sparse.

2. The touch display panel according to claim 1, wherein the display substrate comprises:

a driving backplane;

a light-emitting device layer, provided on a side of the driving backplane facing the touch panel and comprising a plurality of light-emitting devices, wherein the plurality of light-emitting devices are provided in both the first display region and the second display region.

3. The touch display panel according to claim 1, wherein the display substrate comprises:

an array substrate;

a liquid crystal layer, provided on a side of the array substrate close to the touch panel;

a color film substrate, provided on a side of the liquid crystal layer close to the touch panel, wherein the color film substrate comprises a plurality of filter parts, and the plurality of filter parts are provided in both the first display region and the second display region.

4. A display device, comprising:

the touch display panel according to claim 2; and a housing, provided outside the touch display panel, wherein the light shielding layer is located in the housing, the housing has a light transmitting region, and orthographic projections of the light transmitting region and the light transmitting portion on the substrate at least partially coincide.

* * * * *